Nov. 3, 1964  E. J. POSHADEL ETAL  3,154,947
LINEAR SOLID STATE TEMPERATURE DETECTORS
Filed March 9, 1961

INVENTORS
EMIL J. POSHADEL &
GEORGE E. PHILLIPS
BY
their ATTORNEYS

United States Patent Office 3,154,947
Patented Nov. 3, 1964

3,154,947
LINEAR SOLID STATE TEMPERATURE DETECTORS
Emil J. Poshadel, Mount Lebanon, and George E. Phillips, Crafton, Pa., assignors, by mesne assignments, to Hagan Controls Corporation, a corporation of Delaware
Filed Mar. 9, 1961, Ser. No. 94,593
6 Claims. (Cl. 73—362)

This invention relates to linear solid state temperature detectors and particularly to a simple, inexpensive linear temperature detector for temperatures in the range of about −100 to about +300° F.

There has been a great demand for a low temperature measuring device which would eliminate the need for expensive thermo-couple and amplifier circuits for such applications as measuring the temperature of pulverized coal in boiler fuel feed bins, coal and grain silos, grain elevators and many similar solid state media. Prior to the present invention the only reasonably satisfactory electrical system for such temperature measurements were based upon the use of thermo-couples and amplifier systems to amplify the smaller current produced by such thermo-couples.

We have invented a device capable of producing a linear electrical response to changing temperatures in which the output is many times that produced by conventional thermo-couples and which therefore eliminates the need for an amplifier. For example an iron-constantin couple will only produce 0.3 millivolts/degree in the same environment where our invention will produce 12–13 millivolts/degree. We preferably provide an input bridge having a substantially fixed voltage output receiving voltage from a source and delivering it to a second bridge, said second bridge having a pair of temperature sensitive resistances and a pair of compensating resistors whose total resistance varies with temperature from linearity substantially in the same degree but opposite direction from the variation of voltage output from linearity of the first bridge by reason of loading. Preferably the temperature sensitive resistors are sensitors and the voltage of the first bridge is fixed by Zener diodes in one leg thereof.

Figure 1:
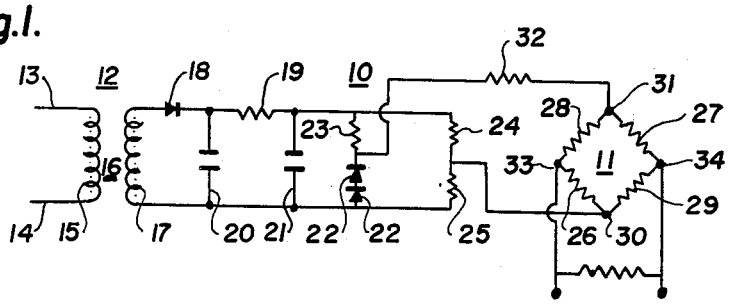
Figure 2:
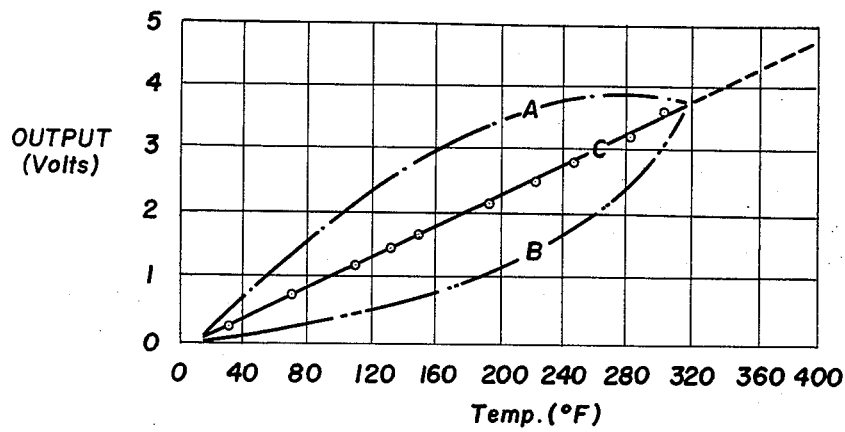
Figure 3:
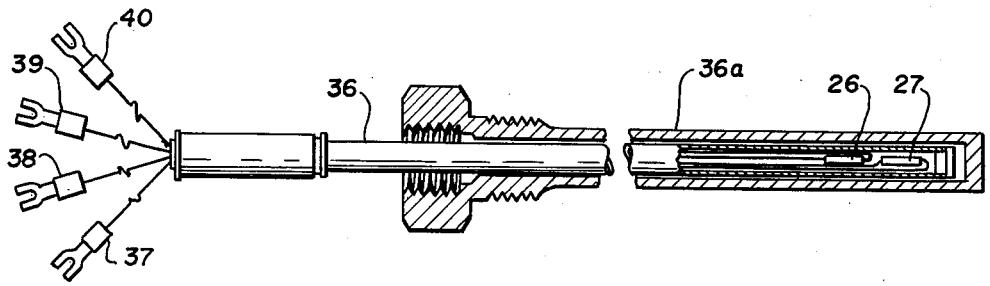

We have described certain objects, purposes and advantages of our invention in the foregoing general description. Other objects, purposes and advantages will be apparent from a consideration of the following description and the accompanying drawings in which, FIGURE 1 is a schematic drawing of a circuit embodying our invention;

FIGURE 2 is a curve of the various elements making up the output from the system set out in FIGURE 1; and FIGURE 3 is a section through a probe carrying the temperature variable resistors.

Referring to the drawings, we have illustrated an input bridge 10, a temperature sensitive bridge 11 and a power supply 12.

The power supply 12 is provided with a 110–120 volt A.C. current at the terminals 13 and 14 of primary windings 15 of the transformer 16. The secondary windings 17 are connected to the bridge 10 through a diode 18 (e.g. IN91 or PT-520) and filter circuit containing resistance 19 (750 ohms) and capacitors 20 and 21 (20 microfarads each). One leg of bridge 10 is provided with Zener diodes 22 and the other legs with resistances 23, 24 and 25 selected to balance the internal resistance of diodes 22.

The temperature sensitive bridge 11 is provided with two sensistors 26 and 27 (Texas Instruments TM ¼) in opposite legs of the bridge with balancing resistors 28 and 29 (700 ohms) in each of the other two legs. The input from bridge 10 is delivered to bridge 11 a terminal 30 between sensistor 26 and resistor 29 and terminal 31 between sensistor 27 and resistor 28. A resistance 32 (400 ohms) may be placed in one of the feed lines from bridge 10 to bridge 11 to affect an accentuation of the load drop on the bridge 10. The output of bridge 11 is delivered from terminal 33 between sensistor 26 and resistor 28 and terminal 34 between sensistor 27 and resistor 29 to a measuring or recording device 35 such as a recording ammeter.

Preferably the sensistors 26 and 27 are inserted in the end of a hollow stainless steel tube 36 adapted to be inserted into a protective probe 36a extending into the material whose temperature is to be followed. Leads 37, 38, 39 and 40 extend from the sensistors through the tube 36 for connection to terminals 30, 31 and 33, 34 of bridge 11. The sensistors 26 and 27 are preferably potted or encapsulated in the end of tube 36 in a casting resin such as Stycast #2651.

With the arrangement described above the curves of bridge 11 output with constant supply voltage and two linear active sensistor elements 26 and 27 is shown as A on FIGURE 2. The curve of supply voltage at the output terminals of bridge 10 due to bridge loading in temperature is shown as B. The linear output at recording device as temperature is shown as C.

The deflection bridge circuit described above provides a voltage proportional to bridge unbalance (C). To achieve the greatest unbalance for a given temperature two sensistors 26 and 27 with high temperature coefficients are placed in opposite legs of the bridge. Since sensistors have a much high temperature coefficient than normal resistance elements, increasing with temperature, greater bridge linearity is achieved than with normal resistors. Using two sensistors in bridge 11 yields twice the linearity correction as well as twice the gain. Since the sensistors have a positive temperature coefficient the bridge 11 presents a decreasing load on the power supply with temperature. The character of the power supply is such that it is affected only by the load changes. With decreasing load the voltage supplied to bridge 11 increases and by proper matching of power supply impedance by resistor 32 to bridge impedance the voltage supplied to the bridge (curve B) can be adjusted to compensate for non-linearity of the bridge (curve A). By utilizing the Zener diodes 22 the voltage from bridge 10 is unaffected by temperature or A.C. supply voltage variations.

While we have illustrated and described certain preferred embodiments of our invention in the foregoing description, it will be understood that this invention may be otherwise embodied within the scope of the following claims.

We claim.

1. A linear solid state temperature detector comprising a temperature responsive bridge having at least one resistance which varies substantially linearly with temperature, an input bridge having a substantially fixed voltage output which varies from linearity substantially opposite in amount and direction from the output of the temperature sensitive bridge, said temperature responsive bridge receiving its entire input from the input bridge, a source of voltage connected to said input bridge and an output measuring device receiving the output from the temperature sensitive bridge.

2. A linear solid state temperature detector comprising a temperature responsive bridge having a pair of sensistors whose resistance varies substantially linearly with temperature, an input bridge having a substantially fixed voltage output which varies from linearity substantially opposite in amount and direction from the output of the temperature sensitive bridge, said temperature responsive bridge receiving its entire input from the input bridge, a source of voltage connected to said input bridge and an output measuring device receiving the output from the temperature sensitive bridge.

3. A linear solid state temperature detector comprising a temperature responsive bridge having a pair of sensistors in opposite legs thereof whose resistance varies substantially linearly with temperature, an input bridge having diode means in one leg whose break-down point lies at a substantially fixed voltage whereby the output varies from linearity substantially opposite in amount and direction from the output of the temperature sensitive bridge, said temperature responsive bridge receiving its entire input from the input bridge, a source of voltage connected to said input bridge and an output measuring device receiving the output from the temperature sensitive bridge.

4. A linear solid state temperature detector comprising a temperature responsive bridge having a pair of sensistors in opposite legs thereof whose resistance varies substantially linearly with temperature, an input bridge having a pair of Zener diodes in one leg and resistances balancing the internal resistance of said diodes in the remaining legs, said bridge output being a substantially fixed voltage output which varies from linearity substantially opposite in direction and amount from the output from the temperature sensitive bridge, said temperature responsive bridge receiving its entire input from the input bridge, a source of voltage connected to said input bridge and an output measuring device receiving the output from the temperature sensitive bridge.

5. A linear solid state temperature detector as claimed in claim 4 wherein the sensistors are fixed within the end of an elongated hollow probe adapted to extend into the mass whose temperature is to be measured.

6. A linear solid state temperature detector comprising a temperature responsive bridge whose output varies substantially linearly with temperature, an input bridge having a substantially fixed voltage output which varies from linearity substantially opposite in direction and amount as the output from the temperature sensitive bridge, said temperature responsive bridge receiving its entire input from the input bridge, a source of voltage connected to said input bridge and an output measuring device receiving the output from the temperature sensitive bridge.

References Cited in the file of this patent

UNITED STATES PATENTS

| | | |
|---|---|---|
| 2,016,660 | Weeks | Oct. 8, 1935 |
| 2,321,846 | Obermaier | June 15, 1943 |
| 2,377,370 | Potter et al. | June 5, 1945 |
| 2,771,579 | Ruge | Nov. 20, 1956 |
| 3,008,084 | Cotton | Nov. 7, 1961 |